United States Patent [19]
Bodford et al.

[11] Patent Number: 5,523,146
[45] Date of Patent: Jun. 4, 1996

[54] COMPOSITE WITH DISCONTINUOUS ADHESIVE STRUCTURE

[75] Inventors: Carl A. Bodford, Charlottesville; Stephen O. Chester, Staunton; Rahul K. Nayak, Waynesboro, all of Va.

[73] Assignee: Poly-Bond, Inc., Charlottesville, Va.

[21] Appl. No.: 420,328

[22] Filed: Apr. 11, 1995

Related U.S. Application Data

[60] Continuation of Ser. No. 220,671, Mar. 31, 1994, abandoned, which is a division of Ser. No. 2,421, Jan. 8, 1993, Pat. No. 5,342,469.

[51] Int. Cl.$^6$ ..................................................... B32B 27/14
[52] U.S. Cl. ........................ 428/198; 428/200; 428/201; 428/214; 428/224; 428/261; 428/284; 428/286; 428/315.5; 428/411.1; 428/500; 428/913; 604/358; 156/167
[58] Field of Search .......................... 428/40, 200, 201, 428/213, 214, 224, 261, 284, 286, 315.5, 354, 411.1, 500, 913, 198; 604/358; 156/167

[56] References Cited

U.S. PATENT DOCUMENTS

| | | | |
|---|---|---|---|
| 3,008,862 | 11/1961 | Haine et al. | 156/244.22 |
| 3,629,027 | 12/1971 | Germain | 156/167 |
| 4,573,986 | 3/1986 | Minetola et al. | 604/366 |
| 4,849,049 | 7/1989 | Colton | 156/291 |
| 4,960,619 | 10/1990 | Slautterback et al. | 427/265 |
| 5,037,411 | 8/1991 | Malcolm et al. | 604/358 |
| 5,061,170 | 10/1991 | Allen et al. | 425/197 |
| 5,102,484 | 4/1992 | Allen et al. | 156/244.11 |
| 5,145,689 | 9/1992 | Allen et al. | 425/72.2 |
| 5,160,746 | 11/1992 | Dodge, II et al. | 425/7 |
| 5,236,641 | 8/1993 | Allen et al. | 264/40.1 |
| 5,269,670 | 12/1993 | Allen et al. | 425/72.2 |
| 5,316,836 | 5/1994 | Heindel et al. | 428/284 |

OTHER PUBLICATIONS

Tomita et al. JP 63-247709, Patent Abstracts of Japan vol. 14, No. 298 Jun. 27, 1990.

*Primary Examiner*—William A. Krynski
*Attorney, Agent, or Firm*—Amster, Rotthstein & Ebenstein

[57] ABSTRACT

A composite includes a first substrate, a second substrate, and a discontinuous adhesive structure disposed intermediate the first and second substrates for securing the first and second substrates together to form a composite without significantly modifying the properties of either of the first and second substrates. The discontinuous adhesive structure is an array of substantially linear filaments or strands of an adhesive.

24 Claims, 2 Drawing Sheets

COMPOSITE WITH DISCONTINUOUS ADHESIVE STRUCTURE

This is a continuation of application Ser. No. 08/220,671, filed on Mar. 31, 1994, now abandoned, which is a divisional of application 08/002,421, filed on Jan. 8, 1993, now U.S. No. 5,342,469.

BACKGROUND OF THE INVENTION

The present invention relates to composites, and more particularly to composites including first and second substrates and an adhesive structure disposed intermediate the first and second substrates for securing them together to form the composite.

The term "composite" as used herein and in the claims includes a first substrate, a second substrate and an adhesive structure disposed intermediate the first and second substrates for securing the first and second substrates together. In a broader sense, the term "composite" may include first and second substrates which are bound together directly (that is, without an intervening adhesive structure) but such materials are not to be considered part of the present invention since the substrates useful therein are typically severely limited and the techniques required in order to cause lamination or joinder of the first and second substrates typically requires the property of at least one of the substrates to be significantly modified. Such a composite may require heat, pressure or a combination thereof to be applied to the substrates in order to join them, as by applying one substrate in a hot, molten form to the other substrate or passing an assembly of the substrates through the heated nip of a pair of pressure rolls (i.e., calendering). In such cases, the heat and/or pressure tends to significantly modify the properties of at least one of the substrates—for example, converting a breathable or vapor-permeable substrate into a non-breathable or vapor-impermeable substrate. Such a calendering process limits the possible substrate combinations since both substrates should have a similar melting point in order to achieve adequate bonding without creating in the substrates heat-generated pinholes which might alter the properties thereof.

In a composite, as the term is defined above—that is, requiring in addition to the substrates an adhesive structure therebetween—there is less opportunity for one substrate to affect the other substrate since the adhesive structure is disposed intermediate to the two substrates and the two substrates are typically not in direct physical contact. On the other hand, the nature of the adhesive structure may itself affect the properties of either substrate or the composite. Thus, the application of a hot melt adhesive to the substrates may cause melting of one or both substrates (since the hot melt adhesive is typically applied at temperatures of about 375° F.) or the molten adhesive may flow into small apertures or pores of one of the substrates to render it less permeable. Even where the adhesive structure itself does not significantly alter the structure of the substrates directly, it may do so indirectly by modifying the properties of the composite. For example, if two breathable or water-permeable substrates are joined by a continuous adhesive structure which is non-breathable, the adhesive structure, in effect, negates the breathability of the substrates and results in a non-breathable composite.

Accordingly, it is an object of the present invention to provide a composite wherein an adhesive structure is disposed intermediate a pair of substrates for securing the substrates together to form the composite without significantly modifying the properties of either substrate directly.

Another object is to provide such a composite wherein the adhesive structure does not significantly modify the properties of either of the substrates indirectly—that is, it does not modify the properties of the composite from what they would be if the composite consisted exclusively of the first and second substrates.

A further object is to provide a method of forming such a composite.

It is also an object of the present invention to provide such a composite wherein both substrates are permeable to water vapor but at least one of the substrates is water-impermeable.

SUMMARY OF THE INVENTION

It has now been found that the above and related objects of the present invention are obtained in a composite, including a first substrate, second substrate, and an adhesive structure disposed intermediate the first and second substrates for securing them together to form the composite. The adhesive structure is discontinuous so that it secures the first and second substrates together to form the composite without significantly modifying the desired properties of either of the first and second substrates.

In a preferred embodiment, the discontinuous adhesive structure comprises an array of substantially linear filaments or strands of an adhesive, preferably 3–100 microns in diameter. The discontinuous adhesive structure is of substantially uniform thickness and is formed of a hot melt adhesive.

In a preferred composite, the first substrate is a liquid-permeable non-woven web, preferably a spunbond web of polyethylene or polypropylene, about 3–40 mils in thickness. The second substrate is a non-apertured liquid-impermeable film which is microporous and vapor-permeable to, preferably a thermoplastic film with a void content of about 25–50% and a thickness of 1–2 mils.

In other composites, the second substrate may be cellulosic tissue or metallized film.

The composite may additionally include a third substrate, and a second discontinuous adhesive structure disposed intermediate the third substrate and one of the first and second substrates for securing the one substrate and the third substrate together to form the composite without significantly modifying the desired properties of either of the third substrate and the one substrate, and preferably without significantly modifying the desired properties of any of the first, second and third substrates.

Preferably, the composite is non-elastic, and the discontinuous adhesive structure has an add-on weight of 1–23 grams per square meter.

The present invention also encompasses a method of forming a composite comprising the steps of providing first and second substrates and then applying to at least one of the first and second substrates a discontinuous adhesive structure and securing the other of the first and second substrates to the discontinuous adhesive structure to form a composite, all without significantly modifying the desired properties of either of the first and second substrates.

In a preferred embodiment, the discontinuous adhesive structure is applied by passing molten hot melt adhesive of suitable viscosity through a die and, before it contacts the respective substrates, cooling the adhesive below the temperature at which the desired properties of the respective substrates would be significantly modified thereby. The adhesive structure is applied at a viscosity of 50–600 poise. Optionally, a sub-assembly formed by the first and second substrates and the discontinuous adhesive structure therebetween is passed through a pair of nip rolls to establish uniformity of contact between the adhesive structure and the substrates.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
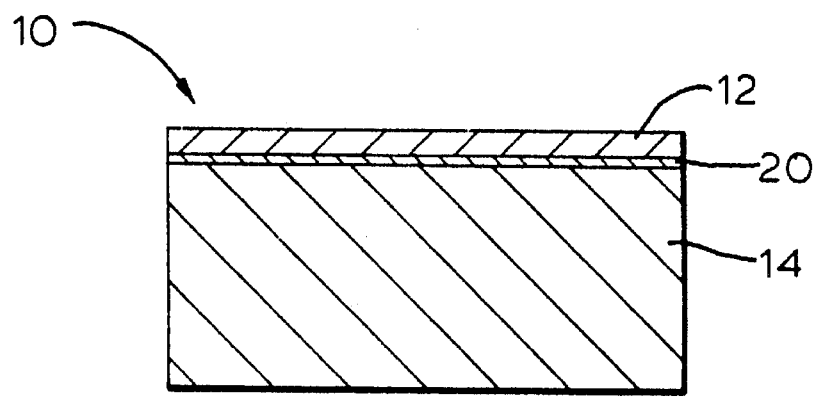
FIG. 1 is a side elevational view of a composite according to the present invention.

Referring now to the drawing, and in particular to FIG. 1 thereof, therein illustrated is a composite according to the present invention, generally designated by the reference numeral 10. The composite comprises a first substrate generally designated by the reference numeral 12, a second substrate generally designated 14, and an adhesive structure generally designated 20 and disposed intermediate the first and second substrates 12, 14 for securing the first and second substrates 12, 14 together to form the composite 10. A wide variety of different materials may be employed as the first and second substrates 12, 14 depending upon the final properties desired in the composite 10. Preferred composites 10 and the substrates 12, 14 used to form them will be discussed hereinafter, it being understood that the selection 0f the particular substrates is not limited to the substrates specifically taught herein.

While the examples of the preferred composites provided below involve only two substrates 12, 14 and an adhesive structure 20 therebetween, clearly the principles of the present invention include the use of additional substrates (such as a third substrate) and additional discontinuous adhesive structures (such as a second discontinuous adhesive structure disposed intermediate the third substrate and one of the first and second substrates) for securing the one substrate and the third substrate together to form the composite without significantly modifying the properties of either of the one substrate and the third substrate. Indeed, the second discontinuous adhesive structure should not significantly modify the properties of any of the first, second and third substrates.

A critical feature of the present invention is that the adhesive structure 20 disposed intermediate the first and second substrates 12, 14 for securing them together to form the composite is both discontinuous and capable of forming the composite 10 without significantly modifying the properties of either of the first and second substrates 12, 14. This is achieved by the adhesive structure 20 being formed of an array of substantially linear filaments or strands of adhesive. The substantial linear filaments are preferably 3–100 microns (optimally 5–30 microns) in diameter and are typically formed by passage through a die (for example, the die of a spinneret) so that the filaments emerge unbroken and substantially linearly (i.e., uncrossed) from the apertures of the die. Incidental transient air currents impinging upon the linear filaments before they contact a substrate may result in some overlapping of the linear filaments as they are laid down upon the substrate; accordingly, the filaments are best described as only being "substantially linear" rather than totally linear. The adhesive structure 20 may be defined by continuous filaments, non-continuous filaments or a mixture of both as the continuous filaments emerging from the die may be broken by incidental transient air currents or the like. The filaments are commonly, but not necessarily, circular in cross section. The adhesive structure 20 is of substantially uniform thickness, typically equal to the diameter of the adhesive filaments since there is essentially only a single layer of filaments intermediate the substrates 12, 14.

The discontinuous nature of the adhesive structure 20 ensures that the adhesive structure 20 will not significantly alter the properties of the substrates 12, 14. Thus, even if the substrates are apertured, water-permeable, or vapor-permeable, the discontinuous nature of the adhesive structure 20 permits these properties of the substrates to determine the properties of the composite since the adhesive structure itself is discontinuous and hence grossly apertured.

The specifics of the adhesive structure 20 will vary with the intended application of the composite and the properties desired therein. Thus, the adhesives useful in the present invention include styrene-isoprene-styrene block co-polymers (SIS), styrene-ethylene-butylene-styrene block co-polymers (SEBS), styrene-butadiene-styrene co-polymers (SBS), ethylene vinylacetate (EVA) and EVA co-polymers, atactic polypropylene (APP), atactic polyalphaolefins (APAO), VESTOPLAST (trademark of Huls America), adhesive-containing KRATON (trademark of Shell Chemical), as well as various combinations of the above-mentioned polymers varying in molecular weight and plasticizer content. In selecting the most appropriate material for the adhesive structure 20, consideration may be given to such characteristics as bond strength, ultra-violet light stability, gamma stability, odor, tack, and the like. The adhesives may be pressure-sensitive or non-pressure-sensitive, as desired. The discontinuous adhesive structure is typically applied at an add-on weight of 1–23 grams per square meter of substrate.

Preferred hot melt adhesives include grade 34-5533 (supplied by National Starch, Bridgewater, N.J.), HL-1280 or HL-6515 (supplied by H. B. Fuller Company, St. Paul, Minn.), and H-2176-01 (supplied by Findley Adhesives, Wauwatosa, Wis.). The various parameters of the process conditions will depend, at least in part, upon the particular adhesive used. Thus, the pre-melt, main melt, transfer hose, die and air temperatures may vary with the adhesive, typical temperatures ranging from 280°–375° F. The pre-melt temperature and main melt temperatures are the temperatures of the adhesive in the hot melt adhesive tank. The transfer temperature is the temperature of the transfer hose through which adhesive is moved from the melt tank to the die assembly. The die temperature is the temperature of the die assembly, and the air temperature is the temperature of the air dispensed from the die assembly.

The adhesive strands will be prepared at a suitable rate (typically from 20 to 70 grams per minute) for dispensation by air or like gas (at a temperature of about 375° F. and a flow rate of about 6–8 cfm) over an 11 inch surface width of the web substrate where the web speed is 100–200 feet per minute. Clearly, the adhesive output will vary with the surface width of the web to be used and the speed of the web.

Figure 3:
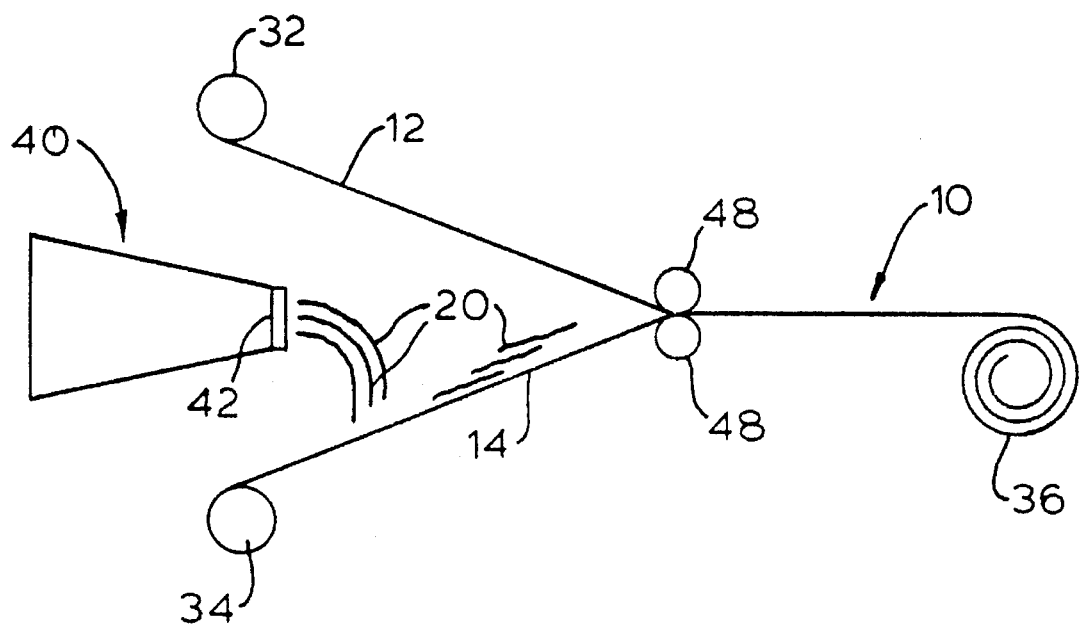
FIG. 3 is a schematic view of a process for making the composite according to the present invention on a generally horizontal production line.
Figure 2:
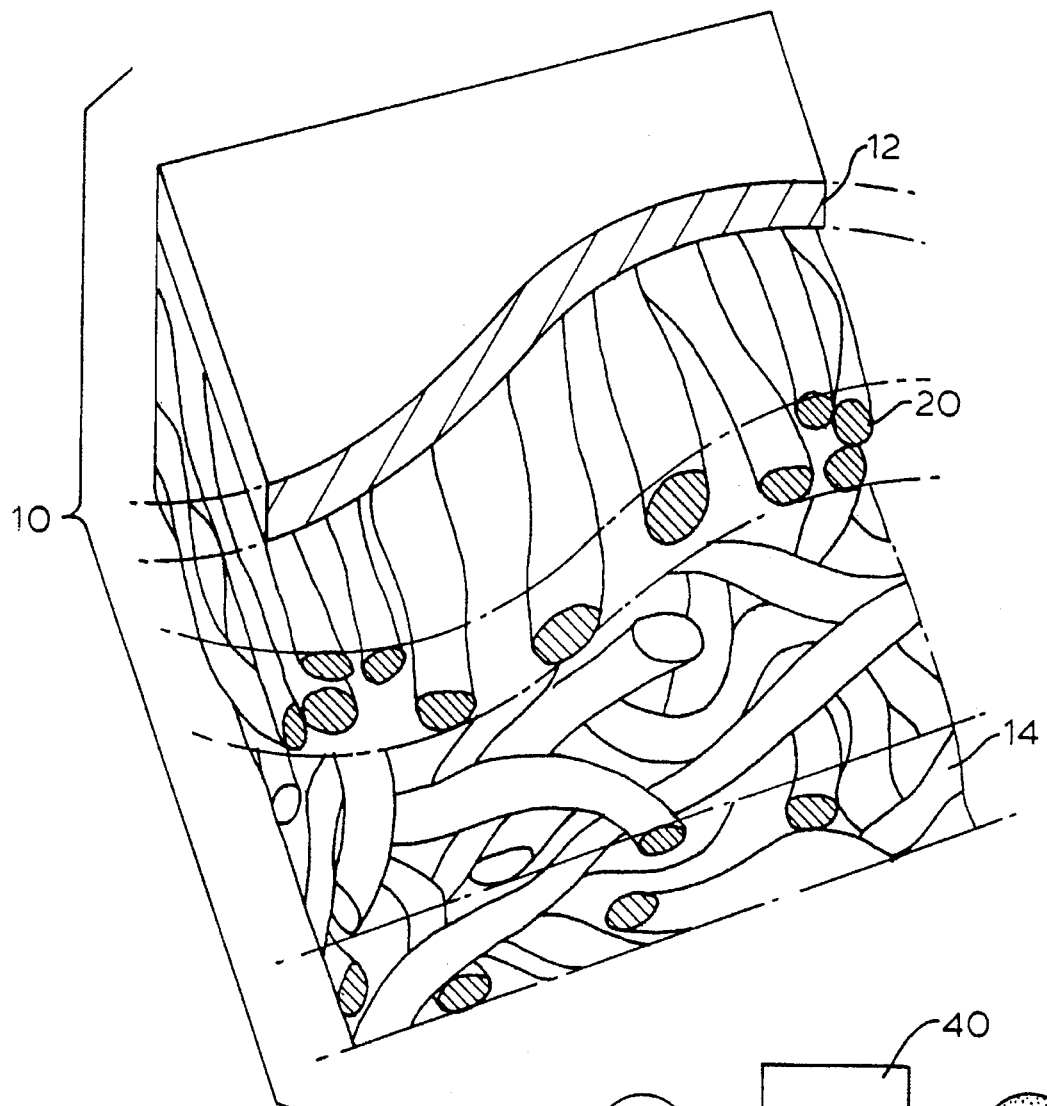
FIG. 2 is an isometric sectional view thereof.

Referring now to FIG. 3, therein illustrated is a process according to the present invention for making the composite 10 on a generally horizontally oriented production line. The first substrate 12 is supplied from a first substrate supply roll 32, and the second substrate 14 is supplied from a second substrate supply roll 34. Both substrates 12, 14 are drawn by a take-up roll 36 where the composite 10 is rolled and stored for future use. A die assembly 40 having a die 42 composed of a plurality of tiny apertures is loaded with a quantity of the adhesive under pressure.

Preferably, the adhesive is a molten adhesive (e.g., a hot melt adhesive) and the die assembly 40 is heated to maintain the adhesive at a temperature which provides the appropriate viscosity for passage of the molten adhesive through the die apertures under the influence of air pressure (e.g., about 375° F. for a 6–8 cfm air flow). The molten adhesive is, in effect, extruded through the die apertures in the molten state, but is allowed to cool before it contacts the first of the substrates (here illustrated as the second substrate 14) to a temperature (e.g., about 100°–125° F.) such that it does not significantly modify the desired properties of that first-contacted substrate 14. By the time the adhesive contacts the other substrate 12, it should be below the temperature at which the adhesive can significantly modify the desired properties of that other substrate 12. Where the adhesive is brought into contact with both substrates 12, 14 substantially simultaneously, then the adhesive must be cooled before it contacts either substrate, to a temperature at which it will not significantly modify the properties of either substrate 12, 14. Preferably the adhesive structure is allowed to cool so that it has a viscosity of about 50–600 poise immediately prior to contacting the first substrate.

The adhesive filaments or strands emitted from the die apertures are preferably allowed to cool naturally (i.e., through heat dissipation to ambient or warm air over the time required for the filaments to reach the substrates) although positive cooling of the filaments may be effected, for example, by an impinging stream of relatively cool air. Any positive cooling of the filaments should be conducted at sufficiently low air velocities that the filaments remain substantially linear with only minimal overlapping and crossing. In order to provide sufficient time for natural or unassisted cooling, the distance between the die head and the web (known as the "die assembly height") is preferably about 1.5–6.0 inches, and optimally about 2.25 inches, so that the adhesive has an opportunity to naturally cool sufficiently before it strikes the web. A lesser spacing may be adequate where positive cooling is used.

The adhesive is typically applied to the web at an angle of about 90°, although this angle may be varied as desired for particular applications. The resultant fabric bond area (i.e., the percentage of the area of each substrate covered by the adhesive) may vary substantially and is preferably from about 4 to 21%.

The adhesive used for the adhesive structure 20 has sufficient tack that, at least with applied pressure, it will bond adequately with the two substrates 12, 14. Preferably, but not necessarily, the sub-assembly formed by the first and second substrates 12, 14 and the discontinuous adhesive structure 20 therebetween is passed through a pair of unheated nip rolls 48 (e.g., the nip rolls of a cooled calendar) to establish uniformity of contact between the adhesive structure 20 and the substrates 12, 14, as illustrated in FIG. 3. The nip rolls may be rubber-coated, coarse or smooth plasma-coated, Teflon-coated or the like and may be cooled by circulating water or refrigerant. In order to assist adequate cooling of the adhesive structure 20 before passage through the cool nip rolls 48, the separation or distance from the die (actually the point on the web which first receives the adhesive) to the nip along the length of the sub-assembly is preferably about 26 inches for a web speed of 100–200 feet per minute, the die-to-nip distance increasing with increasing web speed.

It will be appreciated that the application of the adhesive structure to the substrates 12, 14 described above does not significantly modify the desired properties of the substrates 12, 14. By way of contrast, application of an adhesive through conventional rotogravure techniques tends to produce sheets or relatively large globs of adhesive, while application of an adhesive through conventional blowing of the adhesive onto a substrate tends to produce wide variations in the thickness of the adhesive structure produced. In contrast, the method of the present invention enables the adhesive structure 20 to be formed with variations of thickness across the width of the substrates of as little as plus or minus 2%. Accordingly, the present invention provides a thin and uniform adhesive structure, typically about as thick as the adhesive filament diameter. Since the adhesive structure 20 is at a temperature of only about 100°–125° F. at the time of contact with the substrate, any of a wide variety of substrates may be used to form a composite according to the present invention. Where the porous or permeable structure of a substrate is to be maintained, the substrate need only have a melting point higher than that of the adhesive structure contacting the same (namely, typically about 100°–125° F.).

Figure 4:
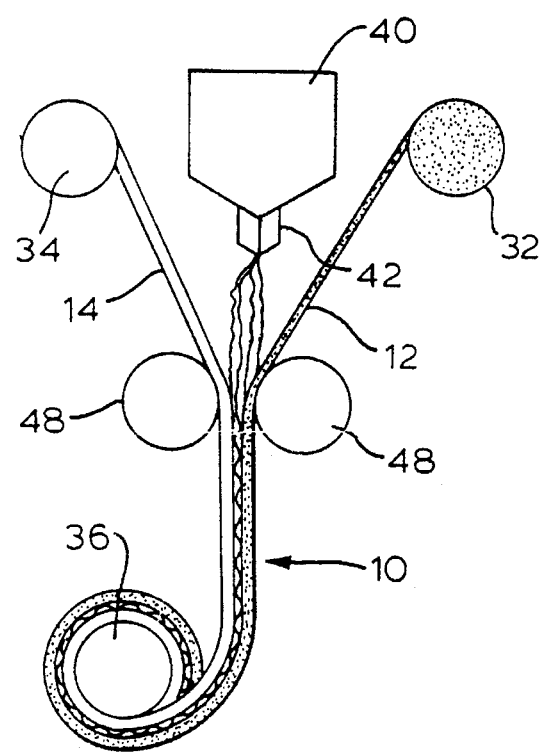
FIG. 4 is a schematic view of a process for making the composite according to the present invention on a generally vertical production line.

Referring now to FIG. 4, therein illustrated is another production line for the manufacture of the composite 10 according to the present invention, this production line differing from the production line of FIG. 3 because it is vertically oriented rather than horizontally oriented. Elements of the production line having the same structure and function as the production line of FIG. 3 are similarly numbered.

In the vertically oriented production line, the adhesive emitted from the die 42 of the die assembly 40 preferably contacts both substrates 12, 14 at the same time so that the application of the adhesive structure 20 to at least one of the substrates 12, 14 and the securing of the other substrate to the adhesive structure 20 occurs simultaneously. The adhesive preferably contacts the substrates 12, 14 as they enter the nip of the rolls 48. Typically the angle at which the adhesive is applied to the substrates 12, 14 is less than 90° and may be different for its contact with each of the substrates 12, 14.

In such a production line, the supply rolls 32, 34 for the substrates 12, 14, respectively, as well as the die assembly 40 and die 42, are disposed above the plane of the rolls 48 while the take-up roll 36 is typically disposed below the plane of the rolls 48, as illustrated in FIG. 4. However, the actual location of the supply rolls 32, 34 and the take-up roll 36 may be varied and, if desired, may be on opposite sides of the plane of the rolls 48. Similarly, while the adhesive is illustrated in FIG. 4 as contacting both substrates 12, 14 simultaneously, when desired, the die 42 may be shifted to one side or the other so that the adhesive emitted therefrom contacts one of the substrates 12, 14 before the other.

A first embodiment of the composite 10 has fluid barrier properties useful in medical and industrial protective garments such as surgical gowns, disposable protective garments, etc. The composite 10 employs a liquid-permeable non-woven web as the first substrate 12 (typically as the inner or wearer-facing surface), a breathable or vapor-permeable, non-liquid permeable film as the second substrate 14 (typically as the outer or exposed surface), and a hot melt adhesive as the adhesive structure 20 joining the two substrates 12, 14.

More particularly, the first substrate 12 is preferably a spunbonded polyethylene web having a 3–40 mils thickness corresponding to a basic weight of about 0.3–3.5 oz./sq. yard (osy), and optimally 1.0 oz./sq. yard. Preferred non-woven webs 12 of the composite 10 are spunbonded, carded, spun-laced, melt-blown or the like. The web 12 may be treated to dissipate static charges as necessary for anti-static properties desirable in protective clothing. A chemical finish may be applied to the web surface in order to repel specific fluids. The spunbonded web may have an embossed area covering, for example, 14% of the surface of the web. A fiber denier of 3–6 is preferred because it offers high strength and flexibility. While the resultant web typically feels soft, pliable and comfortable, the textile-like feel or hand may be enhanced by the use of spun-laced non-wovens. Alternatively, the first substrate 12 is preferably a spunbonded polypropylene web having a basis weight of 1.5 osy.

The second substrate 14 is preferably a microporous thermoplastic film having a 1.0 mil thickness. Preferred films 14 of the composite 10 are either a linear, low-density polyethylene or a polypropylene-based film. The pore or void content in the breathable film is preferably 25–50%, with a preferred void content of about 40%, although other void contents may be useful for specific applications. The pore size and content can be varied depending upon the amount of moisture vapor transmission desired through the film. For a pore content of 25–50% and a pore size not in excess of 15 microns, moisture vapor transmission rates of 5,000–11,000 $g/m^2/24$ hours (at 100° F., 100% relative humidity) are obtainable. Where protection against a virus is desired, this film can be doubled over, if necessary, to form a viral barrier. Corona charging of the film may be used to modify its surface tension, either to improve its adhesion properties or its fluid repellent properties. Additionally, such corona charging enhances printability of the structure where printing of designs and logos on the composite is desired. The film 14 may also be one of the commercially available products permeable to water vapor but impermeable to liquid water (e.g., a polyethylene microporous product available under the trade name EXXAIRE from Exxon).

The filamentary hot melt adhesive layer 20 may be sprayed directly onto the spunbonded web 12 using any one of the commercially available systems for continuous spraying of a uniform layer of hot melt adhesive (such as those available from Mercer Corporation of Hendersonville, Tenn. and Acumeter Laboratories, Inc. of Marlborough, Md.).

In the composite 10 thus formed, the spunbonded layer 12 provides strength and dimensional stability as well as softness (hand) and other textile-like properties. The adhesive structure 20 adheres substrates 12, 14 together, the small adhesive filament or strand diameter and its uniform distribution preventing the overall composite from becoming stiff, losing its textile-like hand, or having an uneven thickness. While the spunbonded web 12 is permeable to both liquid water and water vapor, the film substrate 14 is impermeable to liquid water and prevents strikethrough of potentially harmful liquids while still enabling the transmission of water vapor (e.g., sweat) through a garment made thereof to enhance user comfort.

In a related composite 10, the breathable, vapor-permeable film substrate 14 is replaced with a non-breathable, vapor-impermeable film substrate. This composite provides a total barrier construction and is therefore useful in garments to be used in extremely hazardous applications (such as asbestos removal or to prevent strikethrough of blood contaminated with liquid-borne pathogens), albeit with some reduction in user comfort since wearer sweat cannot evaporate therethrough. The total barrier laminate can be used for construction of either the entire garment or merely discretely placed zones of the garment (e.g., forearms and chest).

In still other composites 10, the breathability or barrier properties of the composite may be of no concern, the advantages of the composite arising out of one or more of its other properties—e.g., softness (hand), strength, dimensional stability, absorptiveness, etc.

EXAMPLES

Example 1

Film: EXXAIRE, a linear low density polyethylene biaxially oriented microporous membrane (supplied by Exxon Chemical, Buffalo Grove, Ill.) having a thickness of about 1.0 mil, a surface tension of about 35 dynes/cm, a pore size which does not typically exceed 12 microns, and a reported moisture vapor transmission rate of 6,000–10,000 $g/m^2/24$ hours.

Web: A non-woven spunbonded polypropylene web, thermally bonded, having an embossed area of approximately 14 per cent over the surface of the web, and a fiber denier of 3–6.

Using the equipment shown in FIG. 1, the film and web substrates were bonded together using hot melt adhesive grade 34-5533 (supplied by National Starch, Bridgewater, N.Y.). Other process conditions were as set forth in Table I below.

The resultant composite structure was soft yet strong, and had very good moisture barrier properties suitable for industrial and medical applications.

Example 2

Film: EXXAIRE

Web: A non-woven polyester web SONTARA (supplied by Dupont, Wilmington, Del.).

Using the equipment shown in FIG. 1, the film and web substrates were bonded together using hot melt adhesive HL-1280 (supplied by H.B. Fuller Company, St. Paul, Minn.). The hydroentangled web weight was approximately 1.2 osy and had a polyester fiber blend. Other process conditions were as set forth in Table I below.

The resultant composite structure had a soft hand yet possessed good physical characteristics, including very good barrier properties suitable for industrial and medical applications and comparable to those of the film by itself.

Example 3

Film: EXXAIRE

Web: A non-woven spunbonded polyethylene web thermally bonded, weighing about 1.0 osy, having a point bonded area of approximately 14 per cent over the surface of the web, and a fiber denier of 3–6 denier.

Using the equipment shown in FIG. 1, the film and web substrates were bonded together using the hot melt adhesive of Example 2. Other process conditions were as set forth in Table I below.

The resultant composite structure had a soft hand and excellent moisture barrier properties comparable to those of the film by itself.

Example 4

Film: A metallized biaxially oriented polypropylene film (supplied by Quantum Performance Films, Streamwood, Ill.).

Web: A non-woven spunbonded polypropylene web weighing 1.25 osy, thermally bonded, having an embossed area of approximately 14 per cent over the surface of the web, and a fiber denier of 3–6 denier.

Using the equipment shown in FIG. 1, the film and web substrates were bonded together using hot melt adhesive HL-6515 (supplied by H. B. Fuller Company, St. Paul Minn.) Other process conditions were as set forth in Table I below.

The resultant composite structure possessed excellent moisture barrier and softness properties.

Example 5

Web A: The non-woven airlaid web used was a 32 lbs. cellulosic tissue (supplied by Fort Howard, Wis.).

Film: An embossed polyethylene film (supplied by Rochelle Plastics, Rochelle, Ill.)

Web B: A wetlaid non-woven textile grade 3557D (supplied by Dexter Nonwovens, Windsor Locks, Conn.).

Using the equipment shown in FIG. 1, the film and web A substrates were bonded together using hot melt adhesive H-2176-01 (supplied by Findley Adhesives, Wauwatosa, Wis.). Other process conditions were as set forth in Table I below.

The resultant composite structure was subsequently bonded to web B under the same process conditions so that the film was between the tissue and wetlaid non-woven layers. The resultant material had properties useful in medical applications. The cellulosic tissue layer (web A) provided a high level of absorption of bodily fluids, the film layer provided a good moisture barrier, and the wetlaid textile layer (web B) provided a desirable strength and softness.

TABLE I

| Process Conditions | Example Number | | | | |
|---|---|---|---|---|---|
| | 1 | 2 | 3 | 4 | 5 |
| Pre-Melt T, °F. | 300 | 280 | 297 | 330 | 350 |
| Main Melt T, °F. | 300 | 280 | 295 | 330 | 350 |
| Hose T, °F. | 300 | 300 | 301 | 330 | 350 |
| Die T, °F. | 300 | 300 | 300 | 331 | 350 |
| Air T, °F. | 375 | 375 | 375 | 375 | 375 |
| Air Flow Rate, cfm | 8 | 8 | 8 | 8 | 6 |
| Adhesive Output, gpm* | 59 | 24.5 | 24 | 64 | 27 |
| Web Speed, fpm | 200 | 100 | 100 | 200 | 100 |

| Comparative Test Results | Ex. 2 | Ex. 3 |
|---|---|---|
| MVTR, g/m²/24/Hrs. | | |
| Film | 7,000–8,000 | 7,000–8,000 |
| Composite | 7,600 | 6,500 |
| Gurley Porosity, sec/100 cc | | |
| Film | 300–400 | 300–400 |
| Composite | 250 | 200–300 |

*Applied over an 11 inch width of web substrate at an adhesive application angle of 90°, with a die assembly height of 2.25 inches and a die-to-nip distance of 26 inches.

The comparative results for porosity of the film vis-a-vis the composite for Examples 2 and 3 clearly show that the porosity of the composite was substantially equal to that of the film alone.

The test methods used in the examples were as follows:

Water or Moisture Vapor Transmission Rate (WVTR or MVTR) Through Plastic Film and Sheeting: ASTM F 1249-90 Using a Modulated Infrared Sensor.

Gurley Porosity: ASTM D726, Method A

Hydrostatic Pressure Test: American Association of Colorists and Chemists Test Method 127-1985

Thickness: ASTM D1777

Weight: ASTM D1910

To summarize, the present invention provides a composite wherein an adhesive structure is disposed intermediate a pair of substrates to secure the substrates together to form the composite without significantly modifying the properties of either substrate either directly or indirectly (that is, by modifying the properties of the composite from what they would be if the composite consisted exclusively of the first and second substrates). The present invention provides a method of forming such a composite. In a preferred embodiment of the composite both substrates are permeable to water vapor, but at least one of the substrates is water-impermeable.

Now that the preferred embodiments of the present invention have been shown and described in detail, various modifications and improvements thereon will readily become apparent to those skilled in the art. Accordingly, the spirit and scope of the present invention is to be construed broadly and limited only by the appended claims, and not by the foregoing specification.

We claim:

1. A composite which is impermeable to liquid water but permeable to water vapor comprising:

(A) a first substrate which is permeable to liquid water;

(B) a second substrate which is permeable to water vapor but impermeable to liquid water; and (C) a substantially planar adhesive structure which is discontinuous across the width of one of said first and second substrates, comprising an array along the length of said one substrate of substantially linear, primarily unbroken and elongated filaments of adhesive of a substantially uniform diameter, said diameter being about 3 to 100 microns, disposed intermediate said first and second substrates and securing said first and second substrates together to form a composite without significantly modifying the desired properties of either of said first and second substrates, said adhesive structure having a thickness about equal to said diameter of said filaments and covering about 4 to 21% of each of said first and second substrates.

2. The composite of claim 1 wherein said discontinuous adhesive structure is of substantially uniform thickness.

3. The composite of claim 1 wherein said discontinuous adhesive structure is formed of a hot melt adhesive.

4. The composite of claim 1 wherein said first substrate is a liquid-permeable non-woven web.

5. The composite of claim 4 wherein said first substrate is spunbond.

6. The composite of claim 4 wherein said first substrate is polyethylene or polypropylene.

7. The composite of claim 4 wherein said first substrate is 3–40 mils in thickness.

8. The composite of claim 1 wherein said second substrate is a non-apertured liquid-impermeable film.

9. The composite of claim 8 wherein said film is microporous and vapor-permeable.

10. The composite of claim 9 wherein said film has a void content of about 25–50%.

11. The composite of claim 8 wherein said second substrate is thermoplastic.

12. The composite of claim 8 wherein said second substrate has a thickness of 1–2 mils.

13. The composite of claim 1 wherein said second substrate is cellulosic tissue.

14. The composite of claim 1 wherein said second substrate is metalized film.

15. The composite of claim 1 additionally including a third substrate, and a second discontinuous adhesive structure disposed intermediate said third substrate and one of said first and second substrates for securing said one substrate and said third substrate together to form the composite without significantly modifying the desired properties of either of said third substrate and said one substrate.

16. The composite of claim 15 wherein said second discontinuous adhesive structure does not significantly modify the desired properties of any of said first, second and third substrates.

17. The composite of claim 1 which is characterized by being non-elastic.

18. The composite of claim 1 wherein said discontinuous adhesive structure has an add-on weight of 1–23 grams per square meter.

19. The composite of claim 1 wherein said first substrate in the form of a liquid permeable nonwoven and said second substrate is in the form of a liquid impermeable, vapor-permeable film.

20. A non-elastic composite which is impermeable to liquid water but permeable to water vapor comprising:

(A) a first substrate which is permeable to liquid water;

(B) a second substrate which is permeable to water vapor but impermeable to liquid water; and (C) a substantially planar adhesive structure which is discontinuous across the width of said first and second substrates, comprising an array along the length of said substrates of substantially linear, primarily unbroken and elongated filaments of adhesive of a substantially uniform diameter, said diameter being about 3–100 microns, disposed intermediate said first and second substrates and securing said first and second substrates together to form a composite without significantly modifying the desired properties of either of said first and second substrates, said adhesive structure covering about 4 to 21% of each of said first and second substrates, being of substantially uniform thickness and having an add-on weight of 1–23 grams per square meter, said adhesive structure having a thickness about equal to the diameter of said filaments.

21. The composite of claim 20 wherein said first substrate is a water-permeable non-woven web of spunbond polyethylene or polypropylene having a thickness of 3–40 mils, and said second substrate is a non-apertured microporous water-impermeable thermoplastic film permeable to water vapor having a thickness of 1–2 mils and a void content of about 25–50%.

22. A non-elastic composite which is impermeable to liquid water but permeable to water vapor comprising:

(A) a first substrate which is permeable to liquid water;

(B) a second substrate which is permeable to water vapor but impermeable to liquid water; and (C) a substantially planar adhesive structure which is discontinuous across the width of said first and second substrates, comprising an array along the length of said substrates of substantially linear, primarily unbroken and elongated filaments of hot melt adhesive of a substantially uniform diameter, said diameter being about 3–100 microns, disposed intermediate said first and second substrates and securing said first and second substrates to form a composite without significantly modifying the desired properties of either of said first and second substrates, said filaments of said adhesive structure being substantially parallel to one another at any point along the width of the composite, said adhesive structure covering about 4 to 21% of each of the first and second substrates, being of substantially uniform thickness about the same as the diameter of said filaments and having an add-on weight of 1–23 grams per square meter.

23. A composite comprising:

(A) a first substrate which is a liquid-permeable non-woven web;

(B) a second substrate which is a liquid-impermeable, vapor-permeable microporous film;

(C) a third substrate;

(D) a first substantially planar adhesive structure which is discontinuous across the width of said first and second substrates, comprising an array along the length of said substrates of substantially linear, primarily unbroken and elongated filaments of adhesive of a substantially uniform diameter, said diameter being about 3 to 100 microns, disposed intermediate said first and second substrates and securing said first and second substrates together to form a composite without significantly modifying the desired properties of either of said first and second substrates, said adhesive structure having a thickness about equal to said diameter of said filaments and covering about 4 to 21% of each of said first and second substrates; and (E) a second substantially planar adhesive structure which is discontinuous across the width of said second and third substrates, comprising an array along the length of said substrates of substantially linear, primarily unbroken and elongated filaments of adhesive of a substantially uniform diameter, said diameter being about 3 to 100 microns, disposed intermediate said second and third substrates and securing said second and third substrates together to form a composite without significantly modifying the desired properties of either of said second and third substrates.

24. The composite of claim 23 wherein said third substrate is a liquid-impermeable, vapor-permeable film.

* * * * *